INVENTOR.
Peter M. Minder
BY Lee H Kaiser
Attorney

Nov. 24, 1964 P. M. MINDER 3,158,783
CAPACITOR BANK PROTECTIVE MEANS HAVING
UNBALANCE CURRENT COMPENSATION
Filed Sept. 29, 1958 2 Sheets-Sheet 2
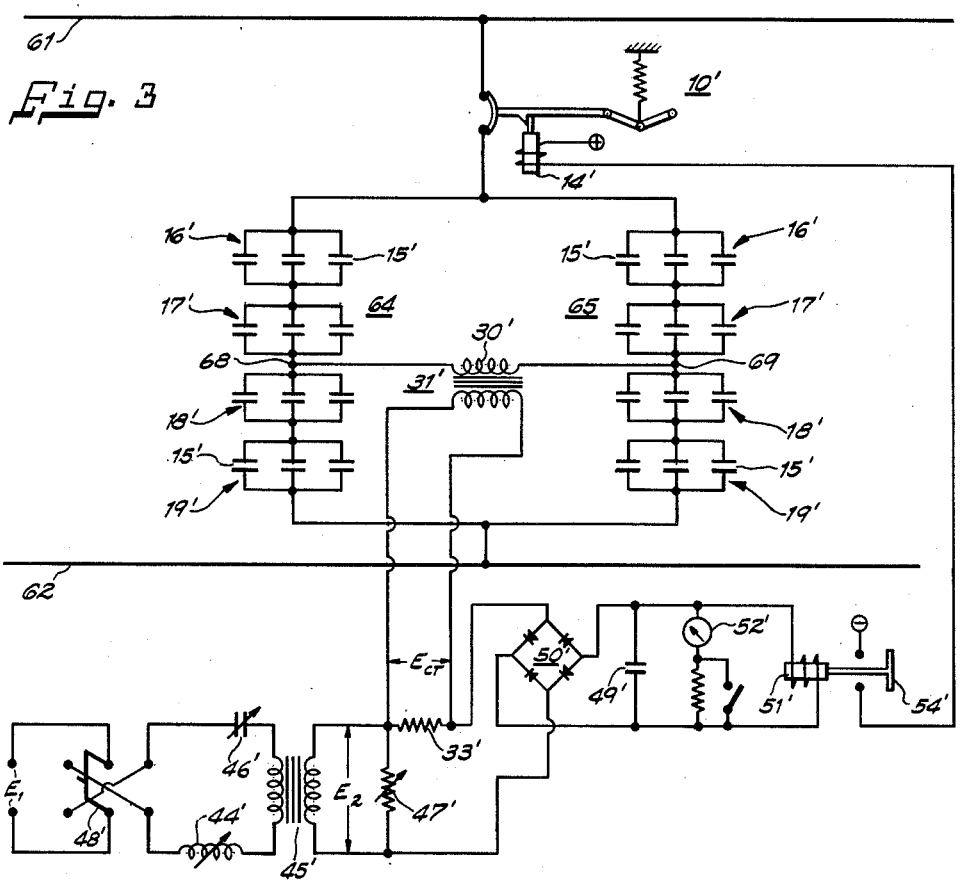
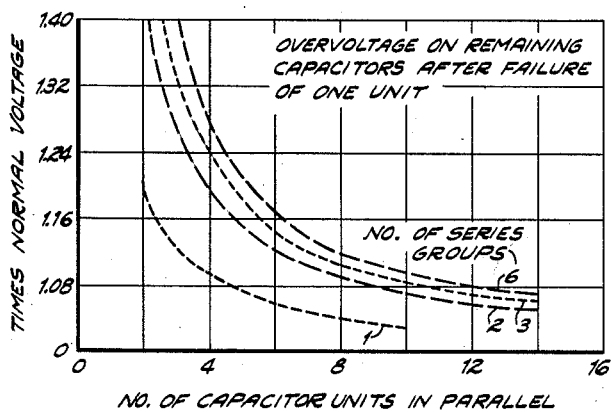
INVENTOR.
Peter M. Minder
BY Lee H. Kaiser
Attorney

United States Patent Office 3,158,783
Patented Nov. 24, 1964

3,158,783
CAPACITOR BANK PROTECTIVE MEANS HAVING
UNBALANCE CURRENT COMPENSATION
Peter M. Minder, Basel, Switzerland, assignor to McGraw-
Edison Company, Milwaukee, Wis., a corporation of
Delaware
Filed Sept. 29, 1958, Ser. No. 763,925
14 Claims. (Cl. 317—12)

This invention relates to shunt capacitor banks for alternating current transmission and distribution lines and in particular to the protection of high voltage, shunt capacitor banks against damage resulting from capacitor failure.

In circuits above 4160 volts it is usually desirable to star connect capacitor units. In one common type of circuit protection for star connected banks, a transformer is connected between ungrounded neutrals of two star banks to operate a relay which is responsive to zero sequence current flowing between the neutrals to trip a circuit breaker and remove the banks from the system. As long as the phase impedances of the two banks are equal, no appreciable zero sequence current will flow and the relay will not operate. If the phase impedances of the banks become unequal, for example, if capacitor failure in one bank causes shift of the neutral of the bank containing the failed capacitor, zero sequence current flows between neutral points to operate the relay and trip the breaker.

Standard power factor correction capacitors are designed for continuous operation at a voltage not exceeding 110% of rated voltage. If an overvoltage of more than 10% occurs on a series group of paralleled capacitors because of the failure of one, the remaining capacitors are endangered by the overvoltage. Consequently protective means should be provided which prevents the capacitors from being subjected to a continuous overvoltage of more than 10%.

When the number of series groups is increased, the magnitude of voltage shift of the neutral resulting from failure of a single capacitor unit decreases, or, stated in another way, the smallest number of capacitor failures in one group that can be detected by a relay connected between the bank neutrals increases. There is a minimum number of capacitors in a series group that must fail in order to cause the voltage to rise by more than 10% across the remaining units. If the number of series groups is increased, this minimum number decreases, or, stated in another way, failure of a single capacitor unit in a group results in a greater overvoltage on the remaining capacitors of the group. Thus just when the increased number of series groups necessitates greater sensitivity of the protective means to assure removal of the bank when the overvoltage exceeds 10%, the voltage shift of the neutral upon failure of a single capacitor unit decreases. Consequently, the minimum number of failures in one group which will cause an overvoltage of 10% on that group may be less than the number of capacitors failures in that group that can be detected by the relay. As an example, in a capacitor bank with five series groups, the neutral shift is only 0.6 percent of the phase to neutral voltage when an unbalance occurs which creates a 10% over voltage across any series group.

The manufacturing tolerances for capacitors are such that there is usually a slight difference in the impedances of the phases. Further, such manufacturing tolerances account for differences in phase impedances of two ungrounded neutral, star connected banks (or of two similar reaction halves of a double-Y bank) and the flow of zero sequence, or unbalance, current between the neutral points. Such inherent unbalance may easily be a few tenths of one percent of the phase to neutral voltage.

The sensitivity of any relay operated from the secondary of a transformer connected between the two neutrals must be such that it will not operate in response to the inherent or primary unbalance. Thus there is a practical limit to the sensitivity of the relay, and in many cases the relay cannot be made sufficiently sensitive to detect the failure of the smallest number of capacitor units of a group which will result in a 10% overvoltage. Various proposals have been advanced to reduce the inherent unbalance current flow between the ungrounded neutrals of two star banks (or a double-Y bank), and one practice followed by electric utilities involves the substitution of capacitor units between phases of the capacitor bank to balance the impedances of the phases. Difficulties in balancing double-Y capacitor banks have led certain utilities to adopt single-Y connections exclusively.

It is an object of the invention to provide a capacitor bank which is adequately protected against overvoltage on any series groups of paralleled capacitors resulting from failure of one or more capacitors.

It is a further object of the invention to provide a protective arrangement for star connected capacitor banks which is sufficiently sensitive to detect a 10% overvoltage on any series group even when a large number of series groups is utilized.

It is a still further object of the invention to provide a protective arrangement for star connected capacitor banks having current sensitive means connected between the ungrounded neutrals thereof which compensates for flow of unbalance current between the neutrals caused by inherent or primary differences in the phase impedances of the banks.

A further object of the invention is to provide means for protecting large, high voltage capacitor banks against dangerous overvoltage resulting from capacitor failure which is not subject to the limitations inherent in protective schemes utilized heretofore, which may be used with either single phase or polyphase banks, and which makes it possible, without sacrifice in protection, to use as many capacitors in series as required to obtain the desired voltage rating.

Another object of the invention is to provide star connected capacitor banks having protective means connected between the ungrounded neutrals thereof wherein it is unnecessary to substitute capacitors between the phases of the banks in order to prevent flow of zero sequence current under normal operating conditions and thus obtain sufficient sensitivity of the protective relay to detect a 10% overvoltage on any series group.

These and other objects and advantages of the invention will be apparent from the following description when taken in conjunction with the accompanying drawing wherein:

FIG. 2 is a set of curves illustrating that the effectiveness of prior art capacitor bank protective means decreases with increase in the number of series groups; and, FIG. 3 is a schematic circuit diagram of a single phase capacitor bank having protective means in accordance with the invention.

Figure 1:
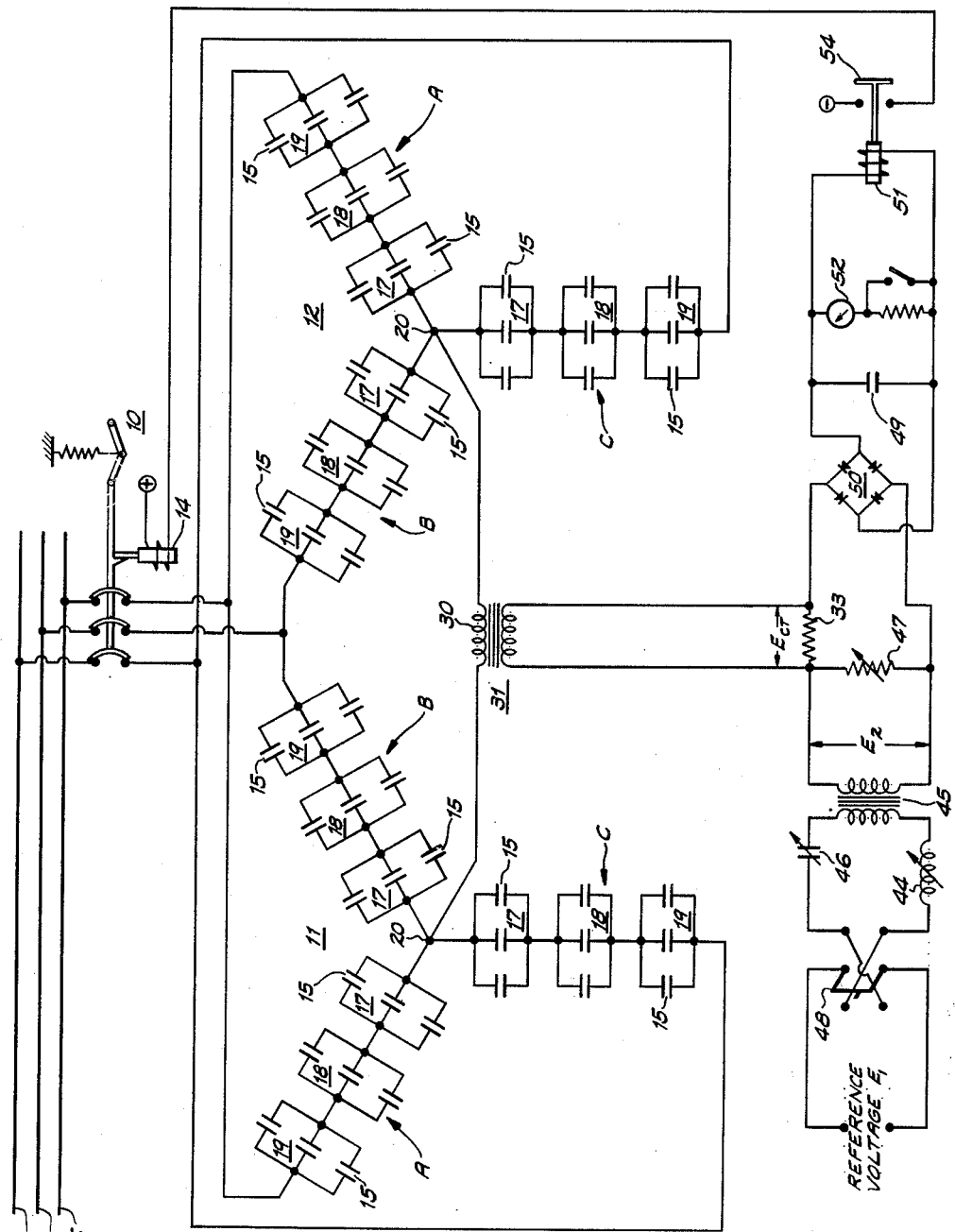
FIG. 1 is a schematic circuit diagram illustrating two star connected capacitor banks having protective means in accordance with a preferred embodiment of the invention connected between the ungrounded neutrals thereof.

In accordance with the invention a capacitor bank comprising a plurality of individual capacitor units adapted to be connected in shunt to an alternating power system is protected by detecting means responsive to an unbalance condition in said bank incident to capacitor unit failure; the capacitance of the individual capacitor units varies from rated value and normally causes inequality in the impedances of the branches and an unbalance condition in the bank; and the protective means includes phase shifting and magnitude varying means for compensating for the normal unbalance condition in the bank so that it is unnecessary to interchange capacitor units between the branches in order to detect fuse operations in a group which would result in excessive operating overvoltage. In accordance with a preferred embodiment, a polyphase capacitor bank is divided into two star portions with a current transformer between the neutrals of the two star portions which normally develops an alternating current signal proportional to the unbalance current flowing between the neutrals resulting from the variations in the capacitance of the individual capacitor units from rated value, and zero sequence responsive protective means are provided including phase shifting and magnitude varying means for deriving a signal equal in magnitude and opposite in phase to said signal normally developed by the current transformer, means for vectorially adding the derived signal and the signal developed by the current transformer, and means responsive to the output of said vectorial adding means.

Referring to drawing and in particular to FIG. 1, a circuit breaker 10 is illustrated as being adapted to connect two similar, equal reactance capacitor banks 11 and 12 in shunt to the conductors $\phi_A$, $\phi_B$ and $\phi_C$ of a three phase alternating current transmission or distribution line. Of course, the two banks 11 and 12 may be the halves of a double-Y bank. The circuit breaker 10 may be of any suitable type and is illustrated as having a trip coil 14 and which may be actuated to closed position manually or in any suitable manner.

Each of the capacitor banks 11 and 12 comprises a plurality of individual capacitor units 15 arranged in series-connected groups 17, 18 and 19 of paralleled capacitor units. Each phase of each capacitor bank 11 and 12 is illustrated as comprising three serially arranged groups 17, 18 and 19, connoted "series" groups, connected between the corresponding phase conductor $\phi_A$, $\phi_B$ and $\phi_C$ and a neutral point 20. Each group 17, 18 and 19 is illustrated as comprising only three capacitor units 15 in parallel, but in practice each group 17, 18 and 19 may comprise any desired number of paralleled capacitor units 15 to obtain the necessary kvar. capacity for the bank. The voltage between the phase conductors $\phi_A$, $\phi_B$ and $\phi_C$ determines the number of "series" groups 17, 18 and 19. For higher voltage it is frequently desirable to connect a relatively large number of capacitors in series to permit use of capacitor units of standard voltage rating. However, when the number of capacitors is increased, there is a limitation on the effectiveness of conventional protective systems.

As explained hereinbefore, capacitors are designed for continuous operation not exceeding 110% of rated voltage, and if an overvoltage of greater than 10% occurs on a series group because of failure of capacitor units, the remaining capacitors are endangered. FIG. 2 shows the maximum voltage existing across the remaining units after failure of a single capacitor unit in a group, and it will be noted that the overvoltage on the remaining capacitors increases with the number of series groups. Conversely, the minimum number of failures in a group which will cause 10% overvoltage on that group decreases with increase in the number of series groups. On the other hand, the minimum number of capacitor failures in a group which can be detected by a current sensitive protective relay increases with increase in the number of series groups. Thus, when the number of series groups is large, the number of capacitors which will cause 10% overvoltage on a group may be less than the minimum number of capacitor failures which can be detected by the relay.

The manufacturing tolerances for capacitance in standard capacitors are such that there is some slight differences in the impedances of the three phases of the capacitor banks 11 and 12. The sensitivity of any current responsive relay connected between the two ungrounded neutrals must be such that it will not operate in response to the zero sequence, or unbalance current flowing between the neutral points 20 resulting from differences in the phase impedances of the banks 11 and 12. With five series groups similar to 17 and 18 connected between the phase conductor $\phi_A$, $\phi_B$ and $\phi_C$ and the neutral points 20, the shift of neutral point 20 is only 0.6% of the phase to neutral voltage when capacitor failure occurs which creates a 10% overvoltage across any series group. Unbalance current flowing between neutrals 20 due to impedance differences in the phases resulting from manufacturing tolerance for capacitors may approach, or even be greater than, the unbalance current resulting from such 0.6% shift in the phase to neutral voltage. Thus, with a large number of series groups, the minimum number of capacitor failures which will cause 10% overvoltage on a group may be less than the minimum number of capacitor failures in the group which can be detected by a relay of practical sensitivity connected between neutral points 20.

In accordance with the present invention, capacitor bank protective means are provided which compensate for the inherent flow of unbalance current between the ungrounded neutrals of the banks. Consequently there is no practical limit to the sensitivity of the protective relay. In the preferred embodiment of the invention illustrated in FIG. 1, the primary 30 of a current transformer 31 is connected between the neutral points 20 of the capacitor banks 11 and 12. Variations in phase impedances of the banks 11 and 12 cause an inherent unbalance, or zero sequence, current to flow through the primary 30 of transformer 31, inducing a current in the secondary which flows through resistance 33 and develops a voltage drop $E_{ct}$ across resistance 33.

A constant magnitude reference voltage source $E_1$ is of the same frequency and has a fixed phase relationship with the voltage of the alternating current power system. The reference voltage source $E_1$ is impressed across the series arrangement of a variable inductance 44, the primary winding of a coupling transformer 45, and a variable capacitor 46. The secondary voltage $E_2$ of coupling transformer 45 is impressed across a variable resistance 47.

The variable inductance 44, the variable capacitor 46, and a reversing switch 48 provide a phase shifting network which permits shifting of the voltage $E_2$ through 360° relative to the voltage of the alternating current power system. The sum of voltages $E_2$ and $E_{ct}$ is rectified in a full wave rectified 50, and the output of rectifier 50 is impressed across a filter capacitor 49 and a sensitive relay 51. A voltmeter 52 connected across the output of rectifier 50 may be used to indicate when the voltage $E_2$ is equal in magnitude and opposite in phase to $E_{ct}$, and the variable inductance 44, the variable capacitance 46, the reversing switch 48, and the variable resistance 47 permit adjustment of the phase and magnitude of the voltage.

It will be apparent that other phase shifting networks, for example of the rotating inductive type, may be used instead of the components 44, 46, and 48.

When the phase shifting circuit is adjusted to give zero reading on voltmeter 52, any zero sequence, or unbalance, current flowing between neutral points 20, resulting from impedance differences of the coerresponding phases in the capacitor banks 11 and 12, will be compensated for. Consequently there is no inherent lower limit to the sensitivity of the protective relay as in prior art systems wherein it was necessary to adjust the relay so that it would not operate on circulating unbalance currents resulting from differences in the phase impedances of the banks, and the relay 51 can be made sufficiently sensitive to detect capacitor failure which will cause 10% over-voltage on one group even when many series groups are utilized between each of the phase conductors $\phi_A$, $\phi_B$, $\phi_C$ and neutral point 20. Operation of relay 51 closes contacts 54 and trips the circuit breaker 14 to remove the capacitor bank from the power system. Further, operation of relay 51 may, if desired, actuate a visual or audio warning device to give an indication of capacitor failure.

FIG. 3 illustrates a single phase capacitor bank embodying the invention which may be connected by a circuit breaker 10' across conductors 61 and 62 of a single phase distribution or transmission line. Of course, the conductors 61 and 62 may be a phase conductor and neutral of a polyphase system. Elements of the circuit of FIG. 3 similar to parts of the FIG. 1 embodiment are given the same reference numerals with the addition of the prime (') designation. The current breaker 10' may be of any suitable type and is shown as having a trip coil 14' for removing the bank from shunt relation to the conductors 61 and 62.

The single phase capacitor bank comprises a plurality of individual capacitor units 15' and is divided into two equal reactance branches 64 and 65 which are connected in parallel. Each branch 64 and 65 comprises a number of series groups 16', 17', 18', and 19' of paralleled capacitors 15'. Although only three capacitors 15' are illustrade in each series group 16', 17', 18' and 19', and only four series groups are shown in each branch 64 and 65, it will be understood that actually there will normally be a relatively large number of capacitors 15' connected in parallel in each of the series groups 16', 17', 18', and 19', and the number of series groups will be determined by the voltage of the power system. One end of each branch 64 and 65 is connected to the line 61 by the circuit breaker 10', and the other end of each branch 64 and 65 is connected directly to conductor 62. The primary 30' of a current transformer 31' is connected between points 68 and 69 on the two branches 64 and 65 which would normally be at the same potential if the impedances of the two branches were exactly equal. The transformer 31' has a secondary winding connected in series with a resistance 33' developing a voltage drop $E_{ct}$ thereacross in a manner similar to that described for the embodiment of FIG. 1. The constant magnitude reference voltage source $E_1$ is of the same frequency and has a constant phase relationship with the voltage of the alternating current power system. The voltage $E_1$ is applied across the serial arrangement of variable inductance 44', the primary of coupling transformer 45', and variable capacitor 46' in a manner similar to that described for the embodiment of FIG. 1.

When the impedances of branches 64 and 65 are equal, the current through the capacitor bank will normally divide between the branches 64 and 65, the points 68 and 69 will be at the same potential, and no current will flow through the primary 30' of current transformer 31'. However, any difference in the impedances of branches 64 and 65 will cause an unbalance current to flow in the primary winding 30' of transformer 31'. In a capacitor bank having conventional protective means this unbalance current flow limits the number of series groups which can be safely utilized without risking an overvoltage of more than 10% on the capacitors. The phase shifting and voltage magnitude adjusting means comprising variable capacitance 46', variable inductance 44', reversing switch 48, and variable resistance 47' may be adjusted to compensate for any unbalance current flowing between points 68 and 69 through the primary winding 30', and thus the practical limitation as to sensitivity of the current relay is readily overcome by the protective system of the present invention.

Application Ser. No. 570,980 filed March 12, 1956 entitled "Protection for Shunt Capacitor Banks" in the name of Peter M. Minder and having the same assignee as the present invention, discloses an arrangement for protection of shunt capacitor banks wherein current sensitive means is connected between equipotential points other than the neutrals of two branches of serially arranged capacitors connected in shunt to an alternating current power line. Further, this application discloses that the two branches need not necessarily be of equal reactance and that one branch may comprise impedances other than capacitive. The protective arrangement of the present invention is suitable for systems in accordance with this copending application and is satisfactory for compensating for unbalance circulating currents whenever current responsive protective means are connected between nominally equipotential points in two shunt branches.

It is believed the disclosed means for protecting capacitors of high voltage banks against overvoltage resulting from capacitor failure is free of the limitations in systems utilized heretofore and makes it possible to utilize any required number of capacitors of standard rating in series to obtain the desired voltage rating without sacrifice in protection. While only a few embodiments of the invention have been illustrated and described, many modifications and variations thereof will be apparent to those skilled in the art, and it is intended in the appended claims to cover all such modifications and variations as come within the true spirit and scope of the invention.

What I claim as new and desire to secure by Letters Patent of the United States is:

1. In combination with a polyphase alternating current power system, a plurality of individual capacitor units adapted to be connected in two star portions to said power system a current transformer connected between the neutrals of said star portions, the values of the individual capacitor units varying from rated capacitance and causing variations in impedance between corresponding phases in said star portions and an unbalance current to flow between said neutrals, whereby an alternating current signal is developed by said current transformer, means for deriving an alternating current voltage of the same frequency as the voltage of said power system, means including a variable reactance for varying the magnitude and shifting the phase of said derived voltage, means for adding the voltage output from said last-named means and the voltage developed across said current transformer, and voltage sensitive means actuated by the output of said adding means.

2. A capacitor bank including two branches connected in shunt to an alternating current power line, at least one branch including a plurality of serially-connected groups and each group comprising a plurality of capacitor units connected in parallel, a current transformer connected between nominally equipotential points on said branches, an impedance element connected across the secondary of said current transformer, the impedances of said branches being different, whereby an unbalance current normally flows through said current transformer and a voltage is developed across said impedance element, means for synthesizing a voltage equal in magnitude and opposite in phase to said voltage normally developed across said impedance element including means for deriving a voltage of the same frequency as the voltage of said power line and means for shifting the phase and varying the magnitude of said derived voltage, and capacitor unit failure detecting means responsive to the vectorial sum of said synthesized voltage and the voltage developed across said impedance element.

3. In combination with a polyphase alternating current power system, a polyphase capacitor bank having two portions adapted to be connected in star to said system and each having an isolated neutral and at least one of said portions including a plurality of series-connected groups between each phase and the neutral, each group comprising a plurality of capacitor units connected in parallel, switching means for connecting said capacitor bank to said power system and having a trip coil adapted upon energization of said trip coil to disconnect said bank from said system, current transformer means connected between the neutrals of said star portions, the impedances of the corresponding legs between phase and neutral of said two star portions being different and unbalance current normally flowing between said neutrals through said current transformer means, a first resistor connected across the secondary of said current transformer means, whereby a voltage is normally developed across said first resistor proportional to said unbalance current, a second resistor, a rectifier connected in a series circuit with said first resistor and said second resistor, means for deriving a voltage of the same frequency and having a fixed phase relation with the voltage of said power system, means for regulating the magnitude and shifting the phase of said derived voltage, means for impressing the output voltage from said last-named means across said second resistor, and a relay actuated by the D.C. voltage output of said rectifier for controlling the energization of said trip coil.

4. In combination with a polyphase alternating current power line, a plurality of individual capacitor units adapted to be connected in two star portions to said power line, a current transformer connected between the neutrals of said star portions, the values of the individual capacitor units varying from the rated capacitance and resulting in variation in capacitance between phases in said groups and causing an unbalance current to normally flow between said neutrals, whereby an alternating current signal is developed by said current transformer, phase shifting and magnitude varying means for deriving an alternating current signal equal in magnitude and opposite in phase to said signal developed by said current transformer, means for vectorially adding said derived signal and said signal developed by said current transformer, and detecting means actuated by the output of said adding means.

5. In combination with a capacitor bank having two branches adapted to be connected in shunt to an alternating current power line, at least one of said branches including a plurality of serially arranged groups of paralleled capacitor units, circuit interrupting means between said bank and said line, a current transformer normally connected between equipotential points on said branches, the impedances of said branches being different and normally causing an unbalance current to flow through said current transformer, whereby an alternating current signal is developed across said current transformer, means for deriving an alternating current signal of the same frequency as the voltage of said power line, adjustable means for varying the magnitude and shifting the phase of said derived signal, means for vectorially adding said derived signal and the signal developed by said current transformer, and relay means energized from the output of said vectorial adding means for actuating said current interrupting means.

6. In combination with a polyphase alternating current power line, a polyphase capacitor bank comprising a plurality of individual capacitor units adapted to be connected in star to said power line, circuit interrupting means between said line and said bank, zero sequence voltage responsive relay means for tripping said circuit interrupting means to disconnect said bank from said line incident to failure of a capacitor unit in said bank, the values of the individual capacitor units varying from the rated capacitance and causing variations in impedance between the phases of said bank and capacitor bank neutral voltage shift, whereby a zero sequence unbalance signal normally energizes said relay means, said relay means including magnitude varying and phase shifting means including a variable reactor for nullifying said zero sequence unbalance signal.

7. In combination with a capacitor bank having two branches connected in shunt to an alternating current power line, at least one of said branches including a plurality of serially arranged groups of paralleled capacitor units, a current transformer connected between nominally equipotential points on said branches, capacitor unit failure detecting means coupled to said current transformer and responsive to the flow of a predetermined current through said current transformer, the impedances of said branches being different and an unbalance current normally flowing through said current transformer, whereby an alternating current signal is developed across said current transformer, said detecting means including means for nullifying said alternating current signal developed across said current transformer including means for synthesizing an alternating current signal equal in magnitude and opposite in phase to said alternating current signal developed across said current transformer.

8. A polyphase star-connected capacitor bank having a plurality of serially-arranged groups of paralleled capacitor units in each phase adapted to be connected in shunt to a polyphase alternating current power system, switching means for connecting said capacitor bank to said power system and for disconnecting it from said system, the capacitances of the individual capacitor units being nominally equal and the capacitances of the phases of said bank being nominally equal, detecting means connected between nominally equipotential points in said bank and being operable in response to a predetermined unbalance in the impedances of the bank phases incident to capacitor unit failure in said bank to actuate said switching means to disconnect said bank from said power system, said detecting means including a transformer and relay means in series therewith, the capacitance of the individual capacitor units varying from nominal value and normally causing an unbalance in the phase impedances of said bank and an unbalance signal to be impressed upon said transformer, said detecting means also including phase shifting and magnitude varying means to compensate for said unbalance signal resulting from variation in the capacitance of the individual capacitor units from nominal value, said phase shifting and magnitude varying means comprising variable reactance means and variable resistance means.

9. In combination with an alternating current power line, a capacitor bank comprising a plurality of individual capacitor units adapted to be connected in shunt to said line, circuit interrupting means between said line and said capacitor bank, relay means for controlling said circuit interrupting means, detecting means operable in response to a predetermined unbalance condition in said bank incident to capacitor unit failure in said bank to actuate said relay means in a direction to trip said circuit interrupting means and disconnect said capacitor bank from said power line, the capacitance of the individual capacitor units of said bank varying from the rated value and normally causing an unbalance condition in said capacitor bank of a magnitude less than said predetermined unbalance condition, said detecting means including phase shifting and magnitude varying means for compensating for said normal unbalance condition in said capacitance bank resulting from variation in the capacitance of the individual capacitor units from rated value.

10. A capacitor bank adapted to be connected in shunt to an alternating current power line, said capacitor bank including two parallel branches, each of said branches including a plurality of series-connected capacitors and each capacitor of at least one of said branches including a plurality of capacitor units connected in parallel, means for connecting the capacitor bank in shunt to said power line, a current transformer connected between corresponding points on said branches, the impedances of said branches being different and an unbalance current normally flowing between said points, whereby an alternating current signal is developed by said current transformer, phase shifting and magnitude varying means for deriving an alternating current signal equal in magnitude and opposite in phase to said signal developed by said current transformer, means for vectorially adding said derived signal and said signal developed by said current transformer, and relay means energized from the output of said last-named means.

11. A protective device for a capacitor bank connected in an alternating current power system, comprising, in combination, means connected to the capacitor bank for deriving an alternating current unbalance signal which is a function of the dissymmetry of said capacitor bank, phase shifting and magnitude varying means for developing a compensating alternating current signal which, in normal operation of said capacitor bank, is equal in magnitude and opposite in phase to said unbalance signal, means for vectorially adding said unbalance signal and said compensating signal, and relay means energized from the output of said last-named means.

12. In combination with a polyphase alternating current power system, a polyphase capacitor bank comprising a plurality of capacitors adapted to be connected in star to said power system, zero sequence responsive relay means including a transformer coupled to the neutral of said star-connected capacitors for detecting shift of said neutral, said transformer deriving a zero sequence unbalance signal dependent upon the dissymmetry of said star-connected bank, said relay means also including magnitude varying and phase shifting means energized from an alternating current source having the same frequency and phase as said power system and including a variable inductance for nullifying the zero sequence unbalance signal developed across said transformer in normal operation of said capacitor bank.

13. A protective device for a capacitor bank adapted to be connected to an alternating current power system, said bank including two parallel branches, each of said branches including a plurality of capacitors in series, means including a transformer connected between corresponding points on said branches and a relay coupled to said transformer for detecting failure of capacitors in said bank, said transformer developing an alternating current unbalance signal which is a function of the dissymmetry of said branches and said relay being responsive to a predetermined magnitude of said unbalance signal, said detecting means having means for nullifying the alternating current unbalance signal developed by said transformer during normal operation of said capacitor bank including phase shifting and magnitude varying means for synthesizing an alternating current compensating signal equal in magnitude and opposite in phase to said unbalance signal developed across said transformer during normal operation of said capacitor bank.

14. In combination with a polyphase alternating current power line, a plurality of capacitor units adapted to be connected in two star portions to said power line, a transformer connected between the neutrals of said star portions, the impedances of the phases in said star portions differing and causing a difference of potential between said neutrals in normal operation of said capacitor bank, phase shifting and magnitude varying means for deriving a compensating alternating current signal equal in magnitude and opposite in phase to the signal developed by said transformer in normal operation of said capacitor bank, means for vectorially adding said compensating signal and the alternating current signal developed by said transformer, and detecting means actuated by the output of said adding means.

References Cited in the file of this patent

UNITED STATES PATENTS

| | | |
|---|---|---|
| 1,730,858 | Marbury | Oct. 8, 1929 |
| 1,884,444 | West | Oct. 25, 1932 |
| 2,447,658 | Marbury | Aug. 24, 1948 |
| 2,657,352 | Sink | Oct. 27, 1953 |

FOREIGN PATENTS

| | | |
|---|---|---|
| 163,090 | Sweden | Apr. 29, 1958 |